United States Patent [19]

Foland, Jr. et al.

[11] Patent Number: 5,761,212
[45] Date of Patent: Jun. 2, 1998

[54] CHANNEL QUALITY

[75] Inventors: William R. Foland, Jr., Littleton; Richard T. Behrens, Louisville; Alan J. Armstrong, Longmont; Neal Glover, Broomfield, all of Colo.

[73] Assignee: Cirrus Logic, Inc., Fremont, Calif.

[21] Appl. No.: 545,965

[22] Filed: Oct. 20, 1995

Related U.S. Application Data

[63] Continuation of Ser. No. 87,617, Jul. 1, 1993, abandoned.

[51] Int. Cl.$^6$ .................................................. G11C 29/00
[52] U.S. Cl. .................... 371/21.2; 371/5.1; 360/53; 360/31; 360/48
[58] Field of Search .............................. 371/21.2, 5.1, 371/67.1, 21.1; 360/53, 31, 45

[56] References Cited

U.S. PATENT DOCUMENTS

| | | | |
|---|---|---|---|
| 4,566,044 | 1/1986 | Langdon, Jr. et al. | |
| 4,609,907 | 9/1986 | Adler et al. | |
| 4,890,299 | 12/1989 | Dolivo et al. | |
| 5,121,263 | 6/1992 | Kerwin et al. | 360/53 |
| 5,258,940 | 11/1993 | Coker et al. | |
| 5,341,249 | 8/1994 | Abbott et al. | |
| 5,357,520 | 10/1994 | Arnett et al. | 371/21.2 |
| 5,381,359 | 1/1995 | Abbott et al. | 364/724.19 |
| 5,392,295 | 2/1995 | Coker et al. | |
| 5,400,189 | 3/1995 | Sato et al. | |
| 5,425,033 | 6/1995 | Jessop et al. | 371/5.1 |
| 5,493,454 | 2/1996 | Ziperovich et al. | 360/45 |

OTHER PUBLICATIONS

W.L. Abbott, J.M. Cioffi and J.K. Tapar, "Channel Equalization Methods for Magnetic Storage", presented at the *International Conference on Communications*, 1989.

*Primary Examiner*—Phung My Chung
*Attorney, Agent, or Firm*—Howard H. Sheerin; Dan A. Shifrin

[57] ABSTRACT

A measurement circuit is provided to obtain data for monitoring the quality of performance from a digital read channel. Elements of the digital read channel including a sequence detector are incorporated into an integrated circuit together with the measurement circuit. The measurement circuit relates digitized samples of readback data from a magnetic storage device to surrounding samples so that particular samples can be collected in accordance with their surroundings. The circuit includes a programmable time window which can be repeatedly opened for data collection. The circuit is designed to collect various types of data including the bit error rate, sample value, squared sample error, squared gain error, squared timing error, and the occurrences of sample error when it is outside an acceptable programmable threshold. The measurement circuit includes a signal generator for producing a test pattern that is first stored and then read to produce the digitized readback sample values. The measurement circuit also includes a conversion circuit for converting the test pattern to a sequence of expected sample values in accordance with a state machine model of the sequence detector. The sample value error results from a comparison of the readback sample value to the expected sample value.

31 Claims, 9 Drawing Sheets

| STATE TABLE FOR LOGIC ARRAY 80 |||
| --- | --- | --- |
| CURRENT STATE | ENCODED TEST PATTERN | NEXT STATE |
| 1 | 0 | 4 |
| 1 | 1 | 8 |
| 2 | 0 | 1 |
| 2 | 1 | 5 |
| 3 | x | 2 |
| 4 | 0 | 4 |
| 4 | 1 | 8 |
| 5 | x | 9 |
| 6 | x | 2 |
| 7 | 0 | 7 |
| 7 | 1 | 3 |
| 8 | x | 9 |
| 9 | 0 | 10 |
| 9 | 1 | 6 |
| 10 | 0 | 7 |
| 10 | 1 | 3 | x=0 or 1

STATE TABLE FOR LOGIC ARRAY 90

| CURRENT STATE | NEXT STATE | POSITIVE SELECT | NEGATIVE SELECT | EXPECTED SAMPLE |
|---|---|---|---|---|
| 1 | 4 | 0 | c | -c |
| 1 | 8 | a | c | a-c |
| 2 | 1 | 0 | 1 | -1 |
| 2 | 5 | a | 1 | a-1 |
| 3 | 2 | 0 | b | -b |
| 4 | 4 | 0 | 0 | 0 |
| 4 | 3 | a | 0 | a |
| 5 | 9 | b | c | b-c |
| 6 | 2 | c | b | c-b |
| 7 | 7 | 0 | 0 | 0 |
| 7 | 3 | 0 | a | -a |
| 8 | 9 | b | 0 | b |
| 9 | 10 | 1 | 0 | 1 |
| 9 | 6 | 1 | a | 1-a |
| 10 | 7 | c | 0 | c |
| 10 | 3 | c | a | c-a |

*FIG. 9B*

CHANNEL QUALITY

This application is a continuation of application Ser. No. 08/087,617, filed Jul. 1, 1993, now abandoned.

This invention relates to apparatus for storing and retrieving digitized data on magnetic storage media.

CROSS-REFERENCE TO RELATED APPLICATIONS

This application is related to another co-pending U.S. patent application, namely application Ser. No. 08/222,666 which relates to "Spectral Smoothing Filter." This application is also related to several U.S. patents, namely U.S. Pat. Nos. 5,291,499, 5,297,184, 5,329,554, 5,359,631, and 5,424,881 which relate to "Method and Apparatus for Reduced-Complexity Viterbi-Type Sequence Detectors," "Gain Control Circuit for Synchronous Waveform Sampling," "Digital Pulse Detector," "Timing Recovery Circuit for Synchronous Waveform Sampling," and "Synchronous Read Channel." All of the above-named patent applications and patents are assigned to the same entity, and all are incorporated herein by reference.

BACKGROUND OF THE INVENTION

In digital systems, magnetic media is usually the media of choice for storing data. Magnetic tape systems are used to archive data and magnetic disk systems are used for interactive processing of data with the central processing unit and semi-conductor memory elements.

Drive electronics units for magnetic storage devices provide an interface to the host system for receiving data to be written to the magnetic media and for presenting data to the host that has been read from the magnetic storage media. A transducing head is connected to the drive electronics unit and is situated in close proximity to the magnetic media in order to write data to the media and read data from the media. Significant effort has been made to pack data ever more densely on the media while at the same time improving the write and read control functions to approach error-free operation. In the effort to produce dense recording and error-free retrieval, digital channels with sequence detectors have been developed to view a multi-bit period of the readback waveform produced by the transducing head. That multi-bit period is compared to an expected set of waveforms which correspond to various data bit patterns. By taking discrete samples of the readback waveform and comparing those samples to expected samples, the detector operates to recognize the data bit patterns. A sequence detector of this type is described in the aforementioned U.S. Pat. No. 5,291,499 incorporated herein by reference.

Various transducing heads have been developed in the effort to produce dense recording and still produce error-free retrieval. Regardless of the head technology, the write operation involves reversing the magnetic orientation of the media from north to south or from south to north through changes in electrical current levels from positive to negative or negative to positive. When such transitions occur at a data bit location, the transition may represent a 1 bit while no transition at the data bit location may represent a 0 bit.

Limiting factors in packing data onto the magnetic media are frequently associated with the readback operation where the magnetic transition results in an electrical pulse in the head which is transferred from the head to the drive electronics unit for amplification and detection. The pulse signals at the head are difficult to detect accurately since they are extremely small and therefore subject to obfuscation. Also, increased data density narrows the window in which a transition is read and successive transitions and noise can create shifts in the position of a sensed read pulse large enough to move the pulse out of the window and into another bit location. In general, as media transitions are more densely packed on the media, the reading of those transitions is more sensitive to distortion, timing variations, and noise.

Read channel circuits are provided which are capable of acting in a programmed manner under the control of a microprocessor. Accordingly, since the operation of a sequence detector is improved by properly shaping the received pulses, the digital wave shaping circuits and other digital filters may be programmed to better produce the desired waveform. In that manner the circuits can be optimized to improve data detection capabilities and thereby enable significant increases in data density without sacrificing detection accuracy. The feature of channel programmability also enables it to perform in an optimized manner with many different disk drives and transducing heads from different manufacturers. Additionally, by providing a programmable channel, it may be optimized to the performance of each individual unit on an assembly line. Also, during operation of a device, factors can change due to age, wear, temperature changes, and supply voltage variations creating the need to change channel parameter values in order to extend the life of the unit. Programmability provides the opportunity to monitor performance and change channel parameter values accordingly.

To realize the advantages made possible by providing programmable digital read channels, the user of the channel must have measurement data relating the performance of the channel to its programmable features. The invention herein provides unique measurement capabilities built into the read channel itself in order to provide previously unproducible data. Also, since the digital read channel is economically provided within the framework of an integrated circuit, the needed data collection points and the unique measurement circuits are both embedded within the read channel chip. Through microprocessor control and multiplexing capabilities, the desired measurement circuit can be selected and its output provided to the channel user so that the benefits of channel programmability can be achieved. This is done without requiring excessive use of dedicated output pins on the chip itself.

It is the object of the current invention to enable the full capture of the benefit of digital programmability, together with the cost effectiveness of integrated circuit technology, and make possible the further extension of microprocessor control by providing data measurement circuits within the integrated circuit digital read channel. In that manner disk drive users and manufacturers can optimize the read channel electronics for integration into their product; the performance of individual units can be optimized on the assembly line; and during operation parameter values can be changed to compensate for age, wear, temperature variations, and voltage changes. Additionally, the channel quality measuring circuits can be used to indicate when a disk drive failure is approaching and surface analysis tests can be performed on media to identify scratches or other blemishes making portions of the media unsuitable for recording.

The presence of the channel quality measurement circuits provide a read channel user the opportunity to utilize the microprocessor to continually monitor the operation of the device and change parameter values according to changes in the measured values. Early warning of approaching problems in the disk drive can be ascertained since a diminishing margin for error can be sensed.

3

SUMMARY OF THE INVENTION

Briefly stated, this invention is an on-chip data measurement circuit for monitoring the quality of performance from a digitized read channel for use with a magnetic storage device enabling the assessment of the operation of the device.

A signal generator is provided to generate a test pattern for storage on the magnetic media. During a readback operation, the signal generator generates the same pattern for comparison to the data recovered from the storage media. In that manner, an expected pattern of signals can be compared with what is actually retrieved from the magnetic storage media.

In an illustrative embodiment of the invention, eight measurement modes for determining channel quality are made available. Five of these measurements make use of readback sample values monitored at the input to the sequence detector. The readback sample values are compared to expected sample values generated by the measurement circuit of this invention to produce resultant sample error signals. The sample error signals may be further manipulated by the measurement circuit in various fashions at the selection of the user before being made available to a microprocessor to perform data analysis. Measurement circuit output is placed in microprocessor accessible registers or onto a real-time output indicator pin (NRZ).

The readback sample values are discrete time samples of the amplitude and sign of the readback signal. At the input to the sequence detector, the readback samples represent a signal that has been amplified, shaped and filtered to provide the best chance of accurate data recognition by the sequence detector. By changing values in the control registers which program the amplifiers and filters, the invention enables the user to observe the effect of those changes on sample values at the input of the sequence detector where such changes are critical to accurate detection.

The five modes associated with sample values include accumulated squared sample error, count of occurrences of sample error greater than a specific programmable threshold, less than a specific programmable threshold, or a count of occurrences of sample error outside of a specific programmable window of acceptable error.

The three other measurement modes in the illustrative embodiment include the accumulation of squared error at the phase detector for assessing the performance of the timing recovery loop; the accumulation of squared error at the gain detector to assess the effect of changes in the gain control circuit; and the bit error rate which involves a comparison of the output of the sequence detector to the generated bit sequence.

In the data measurement circuit, expected sample values are generated from the encoded test pattern. The encoded test pattern, together with the sign of the readback signal, is converted to arc data, i.e., a sequence of numbered state transitions according to the state machine of the sequence detector. The arc data are then converted to expected sample values in accordance with the model utilized. Control registers on the chip are controlled by the microprocessor to determine what type of measurement is to be made and how the measured data is to be related to surrounding arcs. Signals for establishing the measurement window are provided to enable the accumulation of error data over specific time intervals. In that manner, data can be repeatedly accumulated during a period of time in which a system event may be occurring.

BRIEF DESCRIPTION OF THE DRAWING

The above-mentioned and other features and objects of the invention and the manner of attaining them will become more apparent and the invention itself will best be understood by reference to the following description of embodiments of the invention taken in conjunction with the accompanying drawing, a brief description of which follows.

FIG. 9B shows a state table for illustrating the development of expected sample values from arc data.

DETAILED DESCRIPTION

Figure 1A:
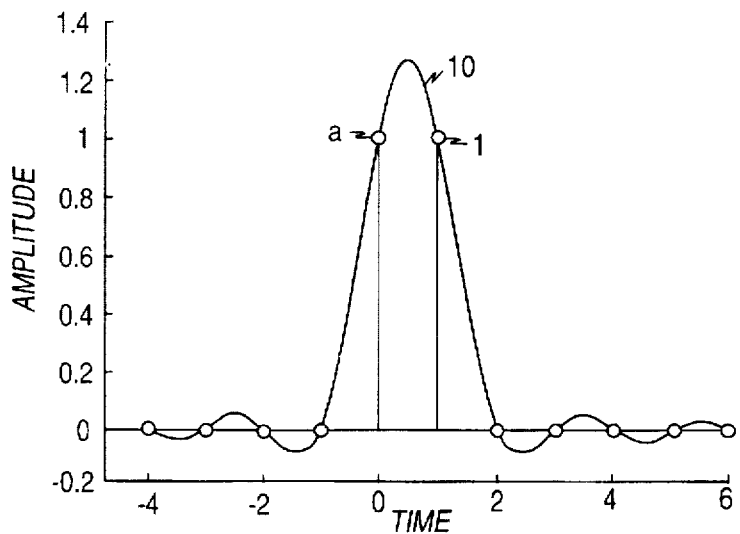
FIGS. 1A–1C show a desired isolated pulse waveform with two, three, and four discrete sample values, respectively, for describing the pulse.

For an understanding of the features of the invention, reference is made to the drawing. In the various figures of the drawing, like reference numerals have been used to identify similar elements.

As mentioned above, digital information is frequently stored by recording patterns of magnetization on a surface such as a magnetic disk or tape. A recorded magnetization pattern induces a time varying electrical response signal in a sensor or read head as the magnetic pattern moves past the read head. The resulting signal is processed electronically to reconstruct the bits of the digital information stored on the disk or tape. The heads are positioned close to the magnetic surface. When the magnetic surface is moved under the head, the head responds to the magnetic flux from the magnetized medium so that a voltage pulse is produced each time the head encounters a transition in the direction of magnetization of the medium.

Ideally, the pulses induced in the read head would be impulse functions of infinite amplitude, zero width, and some finite energy. In reality, there are band width limiting factors in the write process, in the recording medium, and in the read process which produce a pulse of finite amplitude and width. The shape of the pulse is determined by many factors, including the geometry of the head, distance between head and medium, magnetic properties of the medium and the head, etc.

Successive magnetic transitions along a track necessarily alternate in polarity. A transition from north to south magnetization is followed by a transition from south to north. The polarity of the voltage pulses induced in the read head alternate from plus to minus with the polarity of the transitions.

Figure 1B:
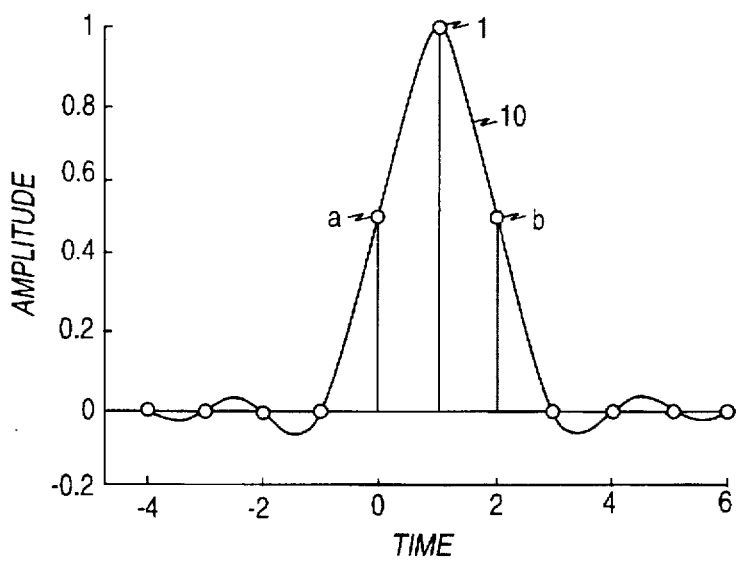
Figure 1C:
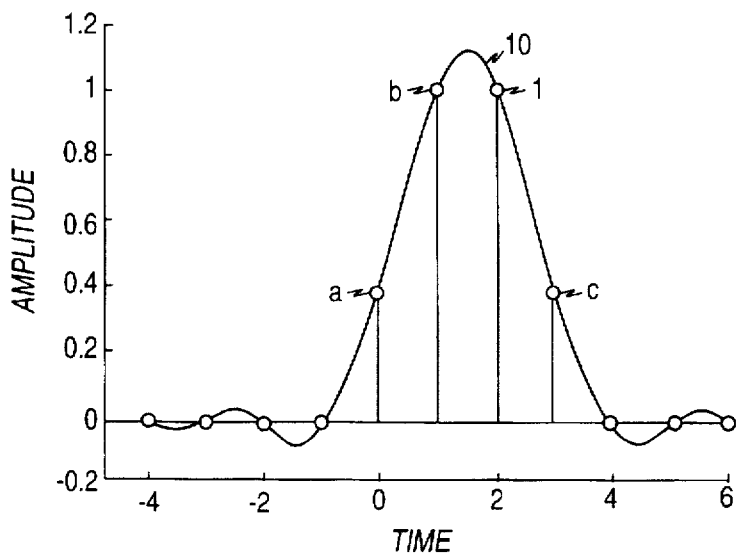

FIGS. 1A–1C show an idealized isolated pulse 10 produced from a read head. The idealized pulse is the product desired from various amplifying and pulse shaping circuits within the read channel. The object of these circuits is to produce a pulse such as shown in FIGS. 1A–1C from which samples are taken to provide a digitized representation of the idealized isolated pulse in a discrete time or digital system. In setting up the system with a programmable sequence detector like that described in U.S. Pat. No. 5,291,499, one of the digital sample values is arbitrarily scaled to be represented by an arbitrary value, for example a "1", the other digital samples taking a ratio thereto. In FIG. 1A, two samples are taken to represent the pulse; samples "a" and 1, "1" being a programmable value. In FIG. 1B, three samples are taken to represent the pulse, a, 1 and b; a and b each being separate programmable values. In FIG. 1C, four samples are taken to represent the pulse; samples a, b, 1 and c; a, b and c each being separate programmable values. Any desired number of samples can be taken relative to the width of the pulse although at the current time the number of samples taken is usually either two, three or four as illustrated in FIGS. 1A–1C.

The two non-zero sample sequence shown in FIG. 1A is well known in the art (when a=1) as the Partial Response Class IV signal model (PR4) corresponding to an expected sample sequence for an isolated transition response pulse of 0,1,1,0. The three non-zero sample sequence shown in FIG. 1B is frequently filtered for an isolated pulse sample sequence of 0,1,2,1,0 or 0.5,1,0.5, depending on whether the normalization is to 2 or 1. This three sample sequence matches the Extended Partial Response Class IV signal model, EPR4. The four non-zero sample sequence shown in FIG. 1C (when $a=\frac{1}{3}$, $b=1$, $c=\frac{1}{3}$) is the Extended, Extended Partial Response Class IV signal model, $E^2PR4$. An approximation of the $E^2PR4$ signal model for an isolated pulse takes an expected sample sequence of $\frac{5}{16}$, 1, 1, $\frac{5}{16}$.

As noted above, in a programmable sequence detector, many different signal models can be utilized, and by making the expected sample values programmable within the sample model as shown in FIGS. 1A–1C, various head-media-drive systems can be more easily matched and optimized for accurate detection. Also, a great variety of retry strategies can be implemented when data detection fails.

An isolated pulse 10 is shown in FIGS. 1A–1C. When magnetic transitions in the medium are densely packed so that adjacent pulse responses produced by the head overlap each other for directly adjacent transitions, the overlapping positive and negative signals add together and the resultant signal model is known as a "partial response" model. In order to accurately reproduce such densely packed data, a sequence detector is required. In a Viterbi sequence detector, the discrete time samples taken from the readback signal are compared to each possible sequence of samples and error tallies are kept. As more samples are taken, less likely choices for sequences are dropped until the most likely sequence is determined.

Figure 2:
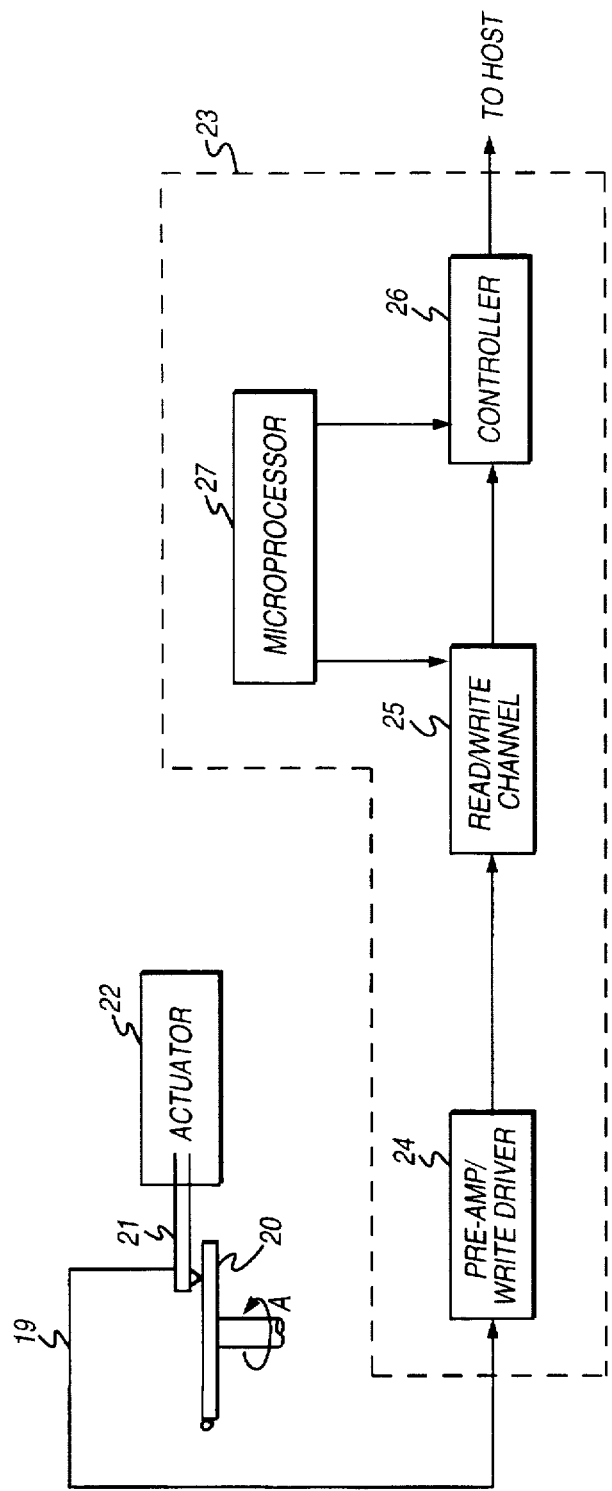
FIG. 2 is a block diagram of a drive electronics unit with a magnetic disk drive.

FIG. 2 shows a magnetic storage unit with a magnetic disk 20 rotating in the direction A under a read/write head 21. Head 21 is positioned by actuator 22 over the track to be written or read. During the read operation, electrical signals produced by head 21 are sent over line 19 to the drive electronics unit 23 for amplification, detection, decoding and presentation to the host which has requested the information from the magnetic storage unit. Major components in drive electronics unit 23 are pre-amp/write driver 24, read/write channel 25, controller 26, and a microprocessor 27 to exercise control over the components in the read/write channel 25 and the controller 26.

Figure 3:
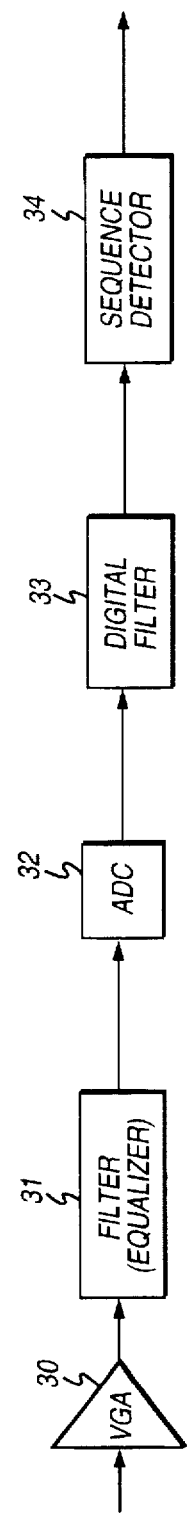
FIG. 3 is a block diagram of those elements in the read channel of the drive electronics unit which receive, shape and digitize the readback waveform for presentation to the sequence detector.

FIG. 3 shows some of the main components in the read/write channel 25, including a variable gain amplifier (VGA) 30, an analog filter 31, an analog to digital converter (ADC) 32, a digital filter 33, and a sequence detector 34. Read/write channels of the prior art generally provide the output of an analog filter directly to a detector which, instead of a sequence detector, is normally a peak detector which produces the digital signals read from the storage media in accordance with peaks in the analog readback signal. In the apparatus associated with this invention, a sequence detector 34 receives the sample values representing the digitized readback signal and provides a comparison of those values representing several sequential digitized bit periods to values representing all the possible idealized sequences which the sequential bit periods can take.

Figure 4:
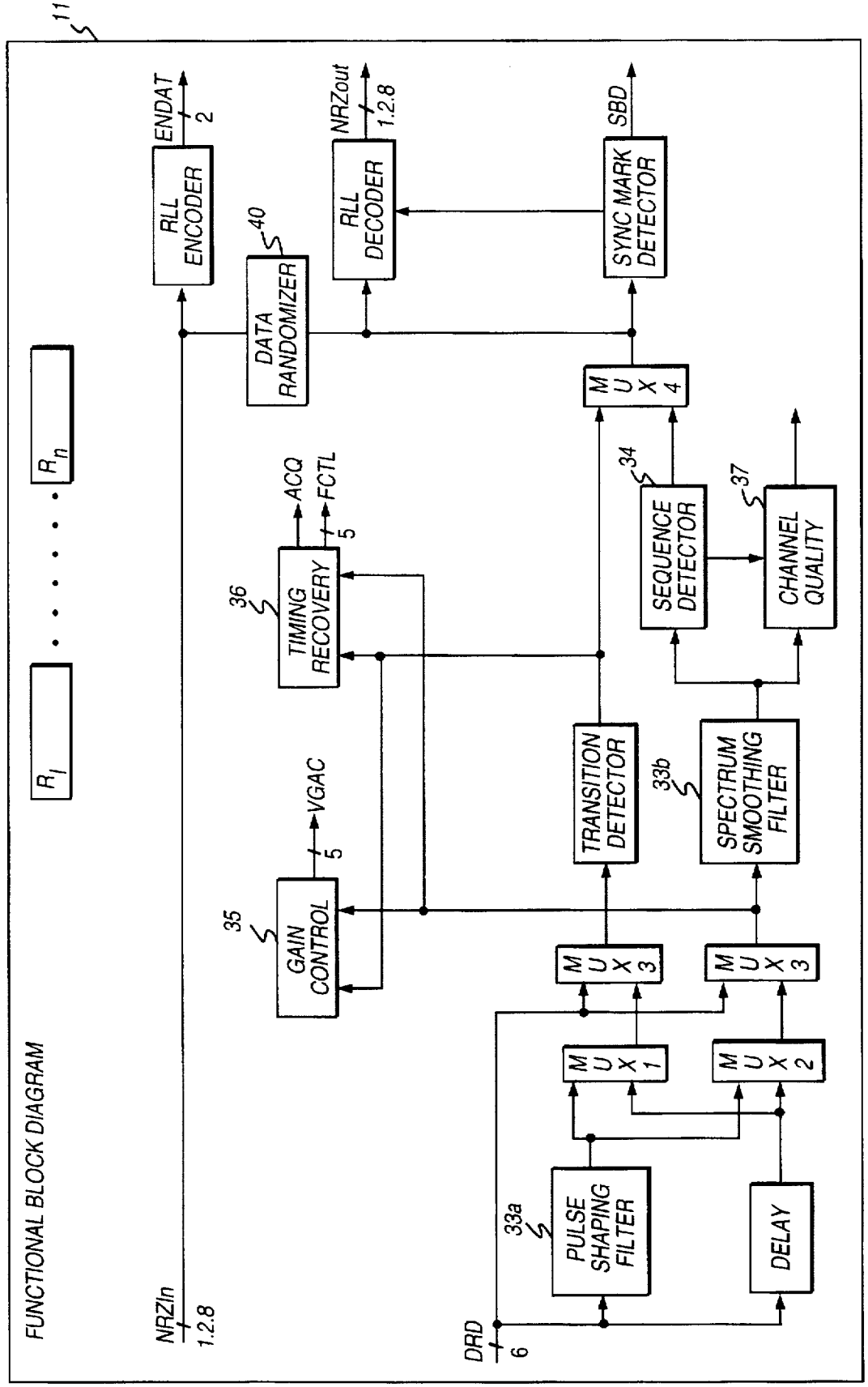
FIG. 4 is a block diagram of the digital portion of the read channel with channel quality components.

FIG. 4 is a more detailed block diagram of a sampled amplitude digital read/write channel employing partial response sequence detection technology. The components shown in FIG. 4 can be combined into a single integrated circuit chip 11 which may include additional circuits as well. At its input, the circuit receives the digitized representations of the read pulses for passing those pulses through the digital filters (33a and 33b) to the sequence detector 34. FIG. 4 also shows various control registers $R_1$ through $R_n$ which are included within the integrated circuit. Registers $R_1$ through $R_n$ are loaded by the microprocessor 27 to order the operation of the circuit of FIG. 4 in accordance with the desired parameter values. In that manner, the read/write channel can be programmed to operate properly with several different disk drives. Connections from the various control registers to control objects are not shown in the simplified block diagram of FIG. 4. Certain of the registers $R_1$ through $R_n$ are also used to receive the output quantities produced by the measurement circuit of the invention so that the microprocessor can access the measured quantities and thereby analyze the quality of operation with the parameters chosen.

In establishing the optimum parameters for operating the various programmable elements of the digital read channel, for example, the pulse shaping filter 33a or the spectrum smoothing filter 33b, changes in the control registers for these units are ordered by the microprocessor. Sample values of the digitized read data produced from specific test patterns are monitored at the input to the sequence detector 34. The measurement circuit of the invention provides an idealized expected sample sequence from the specific test pattern utilized in channel quality circuit 37. Comparison of the readback samples is made to the expected samples and desired measurement data are accumulated and made available to the microprocessor for analysis. Parameters may then be adjusted for further comparison operations until results are optimized.

The measurement circuit includes an emulation circuit corresponding to a state machine model of the sequence detector for identifying a sequence of state transitions corresponding to the input test data pattern, and a conversion circuit for producing a sequence of expected sample values corresponding to the sequence of state transitions. The expected sample values are those values which the sequence detector 34 should receive in idealized operation.

In measurement mode, the measurement circuit of the invention may utilize test patterns produced by an on-chip pseudo-random signal generator used as a data randomizer 40 during normal operating mode. The test patterns produced may be lengthy patterns or rapidly repeating patterns, for example, patterns which repeat every 16 bits. In a particular implementation, the data randomizer includes a 16-bit shift register with feedback, making up the pattern generator. A pseudo-random sequence is generated with a repeat interval of 8001 bits. The shift register seed is programmable. Fixed, repeating patterns can be generated by disabling the feedback. Additionally, arbitrary test patterns may be produced outside the chip, for example, in the controller for testing the channel with particular test pattern input.

The measurement circuit provides means for comparing the generated expected sample values to the readback sample values monitored at the sequence detector input. The resultant sample error value provides an indication of how well the sequence detector will perform should an actual data pattern be similar to the test pattern. Should improvement be needed, the control registers for the various circuit elements can be altered until the entire channel is optimized. In that manner, by utilizing the measurement circuit of the invention, the channel can be optimized for use with a wide variety of different drives from different manufacturers with different heads. On the assembly line, each specific drive/channel combination can be optimized.

During use, the measurement circuit can be utilized to determine whether the sample errors are increasing before actual bit errors occur. If so, means can be provided to reoptimize the system and an early warning of approaching failure can be provided.

The measurement circuit provides means for accumulating readback sample values and means for squaring the sample value error for mean squared error determination. It also provides means for comparing the sample error to a programmable threshold and counting occurrences of errors which exceed the threshold or counting occurrences below a threshold. Threshold levels are provided both above and below the expected values so that, if desired, occurrences of error values are counted only if they fall outside a window of acceptable error value.

The measurement circuit of the invention also provides for the monitoring of error values from the phase detector and from the gain detector. This enables the optimization of programmable parameters for the gain control and timing recovery circuits and enables the user to ascertain the effects of changes in those programmable parameters on the sample error values produced at the input to the sequence detector.

The measurement circuit also provides for the on-chip determination of bit error rate by monitoring the output of the sequence detector and comparing it to the test pattern.

Figure 5:
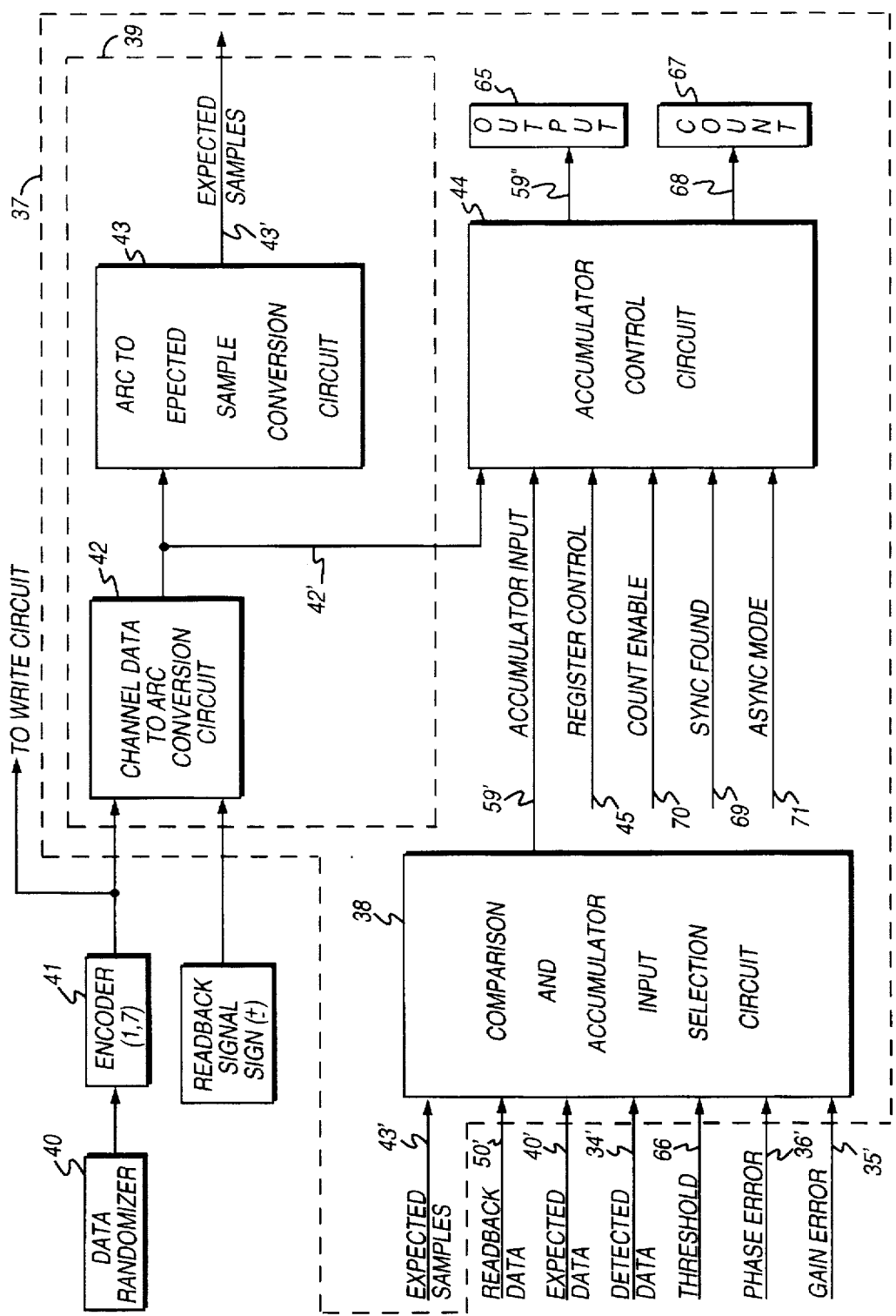
FIG. 5 is a block diagram of the channel quality measurement circuit of the invention.

FIG. 5 is a block diagram showing components found in the channel quality circuit 37 utilized in data gathering "channel quality" mode. A random pattern signal generator 40, which is used as a data randomizer in normal read/write mode, generates a specific test pattern which is encoded with a run length limited code by encoder 41 and written to the disk. Upon readback of the test pattern, the same pattern is again generated by random pattern generator 40, encoded by encoder 41, and sent to a channel data to arc conversion circuit 42. The sign of the readback signal is also supplied to circuit 42 from the sequence detector or from anywhere in the circuit at which the sign of the data read from the disk is available. The output of circuit 42 is a sequence of numbers representing the arc sequence of the state transitions for the sequence of samples produced from the test pattern. Circuit 43 receives the arc information over line 42' and produces the sequence of expected sample values as output on line 43'.

The expected sample values are input to the comparison and selection circuit 38 together with readback samples on line 50'. For other measurements, expected data is input to circuit 38 on line 40' for comparison to detected data on line 34'. The threshold, the phase error, and the gain error are also input to circuit 38 on lines 66, 36', and 35', respectively. The output of comparison and selection circuit 38 is the selected measured data for input to the accumulator control circuit 44 over bus 59'.

The arc information is also provided over line 42' to the accumulator control circuit 44. Bus 45 also connects to circuit 44 to carry input from various control registers to define the particular samples to be accumulated according to their surroundings during the test in process.

Accumulator control circuit 44 can be operated during the acquisition (asynchronous) mode, that is, prior to the sensing of a sync mark or during the tracking or synchronous mode after the sync mark has been found. Since the system must be timed to operate in accordance with the real time readback data bits, a channel quality count enable signal on line 70 is clocked to the data stream bit periods and is input to circuit 44. Such a signal can be conveniently derived from the controller 26.

Figure 6:
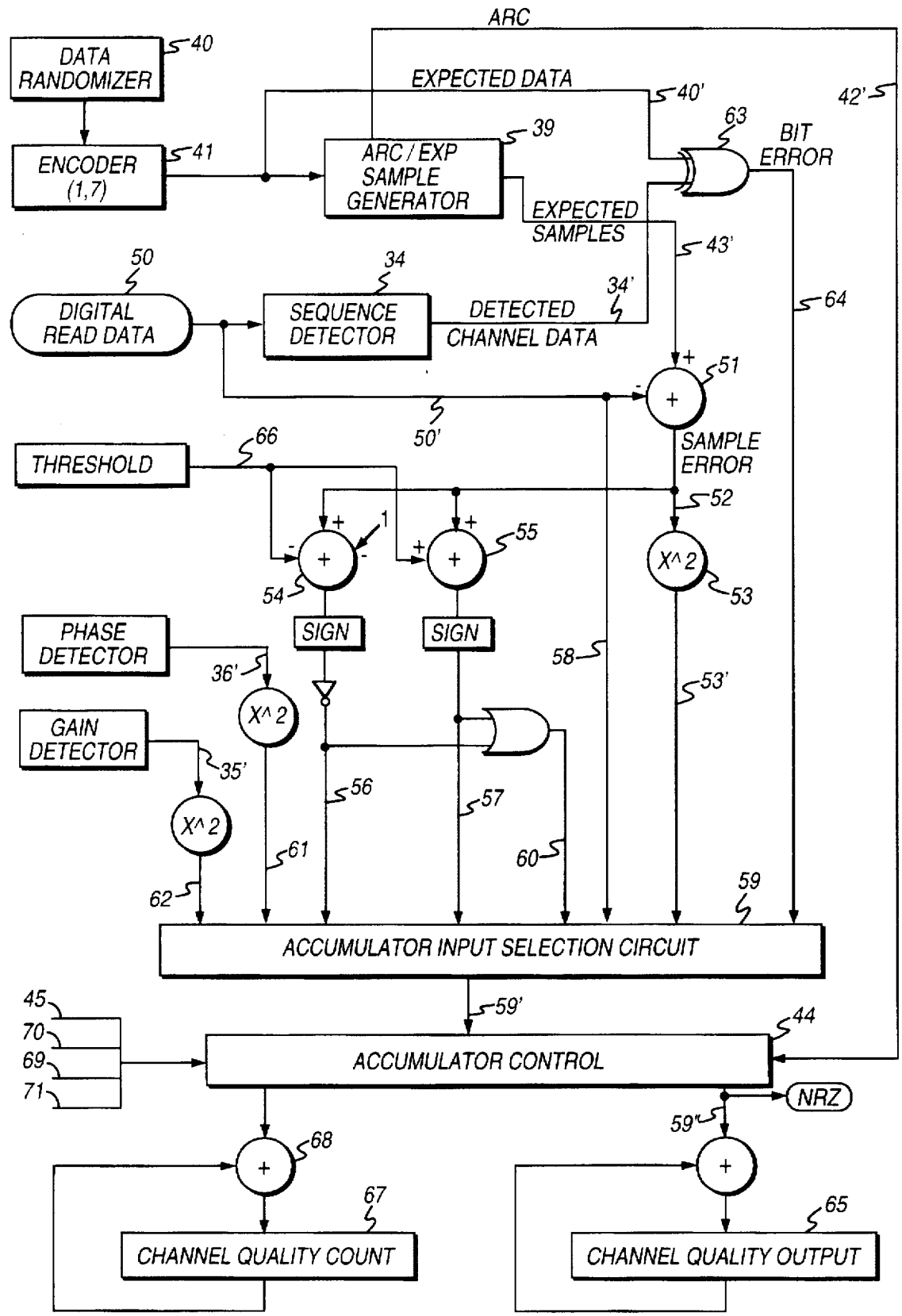
FIG. 6 expands the circuit of FIG. 5.

FIG. 6 is a schematic diagram of the channel quality comparison and measurement selection function incorporated into the integrated circuit. In channel quality mode, the signal generator 40 provides the test pattern sequence of data to the arc/expected sample generator 39 for the production of those samples which may be expected from the data pattern provided. As stated above, the sequence of data produced by the generator 40 has been previously generated and written onto the storage disk. That data is read back during channel quality mode and converted to digitized data by the analog to digital convertor 32. The digital read data 50 shown in FIG. 6 represents the digitized samples produced by ADC 32 as modified by the configuration of the digital circuit (filters 33a and 33b) leading to the input of sequence detector 34. With reference to FIG. 4, note that the pulse shaping filter 33a may or may not be incorporated into the configuration of the circuit depending on the control signals sent to MUX2 and MUX3. Similarly, the presence or absence of the spectrum smoothing filter 33b is provided by the control signals sent to various path control multiplexers internal to the filter. In any event, the samples of digital read data are taken at the input to the sequence detector 34 and provided to comparator 51 for comparison to the expected samples generated by the arc/expected sample generator 39. The difference of those two signals is the sample error. The value of the sample itself is provided over line 58 to the channel quality input source selection circuit 59. The bit error rate and threshold flag indicators can be viewed in real time from the output pin, NRZ, which can be useful for various purposes, for example, determining the locus of a problem.

The sample error value on line 52 is provided to multiplier circuit 53 for squaring the sample error, and the squared product is sent to selection circuit 59 over line 53'. The sample error on line 52 is also provided to comparators 54 and 55 for comparison to a threshold level. If the sample error exceeds the threshold provided to comparator 54, a signal is generated on line 56 for presentation to selection circuit 59. If the sample error signal is less than a specified threshold, a signal is generated on line 57 and sent to circuit 59. Line 60 carries a signal whenever either threshold is crossed.

The operation of the threshold comparator 54 is as follows. The sample error signal, for example +4, is compared to a programmable threshold signal, for example +3. The result includes the subtraction of a 1 giving a result of zero. The two's complement sign bit is the most significant bit; it indicates a positive quantity when zero and a negative quantity when one. The two's complement sign bit of zero is zero, which inverted is one, thus indicating that the threshold was exceeded. Should the error signal have been 3 in the example, the output of comparator 54 is a −1, consequently, the most significant bit is a 1 which inverted is zero, thus indicating that the threshold was not exceeded.

Similarly, the operation of comparator 55 involves comparing the value of the sample error signal, for example, −3, to a threshold level, for example, +2. The function of the circuit is to compare the error signal to the negative of the threshold level. The result is a negative one, the two's complement sign bit of which is a 1 thus indicating that the negative threshold was exceeded.

Threshold determinations can be useful in facilitating the boundaries of media flaws. For example, regions of less than adequate signal levels can be located by selecting the threshold setting appropriately and observing the Threshold Pointer Bits transmitted on the NRZ bus. The delay in the pointer bits from sync byte detection shows the relative media flaw location.

Another input to selection circuit 59 is the bit error indicator on line 64 which is a result of the comparison in comparator 63 of the expected data (the encoded test pattern) with the channel data produced from the output of sequence detector 34. Frequently, the bit error signal is utilized in real time at an output pin, NRZ, and/or accumulated in output accumulator 65.

Other inputs to selection circuit 59 include the squared timing error on line 61 and the squared gain error on line 62.

Source selection circuit 59 is under the control of the programmable control registers on the integrated circuit. These registers are loaded by the microprocessor 27 which can be programmed by the user to select any one of the eight measurement inputs provided to circuit 59. In that manner, the selection of the type of data to be collected is determined. For example, the selected output of circuit 59 may be the squared sample errors produced from squaring circuit 53. Those errors will be accumulated in the channel quality output accumulator 65.

When operating to determine the bit error rate, the channel quality output accumulator 65 accumulates the number of bits in error while the count accumulator 67 accumulates the number of bits within the count window.

The window over which the errors will be accumulated is determined by the accumulator control circuit 44. A count of the total number of samples in the window is kept in accumulator 67 for use with the error accumulation.

Additionally, the control registers and the arc data are input to accumulator control circuit 44 and enable the user to program the measurement circuit to relate the sample to its surrounding samples so that a particular sample may be accumulated only if its surroundings are selected. For example, a "b" sample may be accumulated if it is followed by a "1", but not accumulated otherwise. Also, the sample can be related to surrounding arcs so that sample values in a specific arc sequence can be measured. Since a sample is related to an arc, and an arc can be selected based on its context relative to surrounding arcs, samples can be accumulated when a specific sequence of state transitions occurs and disregarded otherwise.

Figure 7:
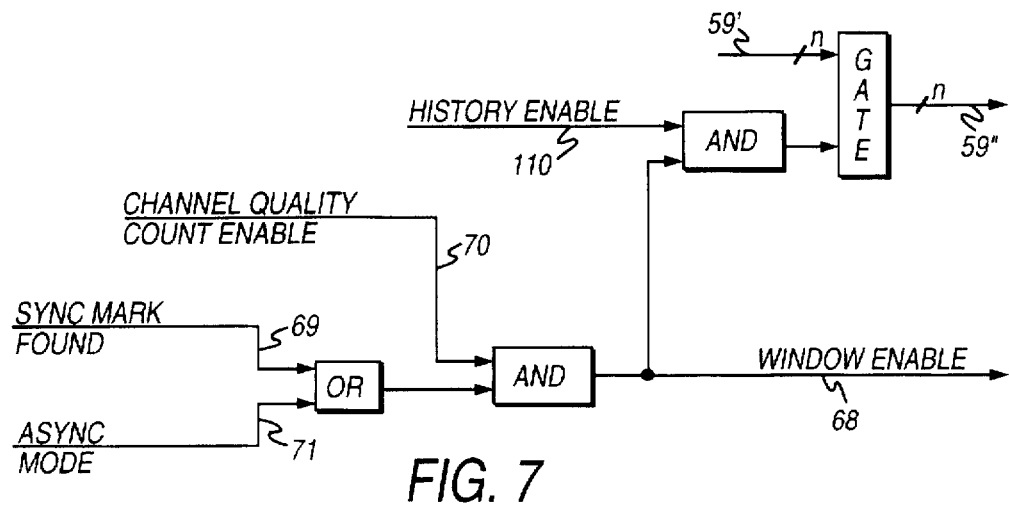
FIG. 7 shows the control of the count and output accumulators.

The window enable signal 68 is a control signal which gates the accumulator 67 to accumulate sample counts over a selected period and gates the accumulator 65 to accumulate sample output signals during the same period. The signal 68 is shown on FIG. 5 as an output of the accumulation control circuit 44. FIG. 7 shows the generation of the window enable signal 68 within the control circuit 44. During synchronous mode, the window enable signal is generated from a combination of the sync mark found signal 69 and the channel quality count enable signal 70. During asynchronous mode, the window enable signal 68 is generated from the asynchronous mode signal 71 and the signal 70. In that manner, the channel quality count enable signal 70 can be used to control the window of data collection in either mode. Signal 70 is clocked to the real time data stream and is conveniently generated at the controller 26. Note from FIG. 7 that window enable signal 68 is used together with history enable signal 110 to gate the accumulator input on bus 59' to bus 59". When either signal 68 or 110 is inactive, bus 59" is zero and thus the output accumulators 65 and 67 are inactive. In that manner, measurements are made only for data collected during a specified period and with a specified history of appropriate surroundings. The generation of the history enable signal is discussed, infra, with respect to FIG. 10.

Figure 8A:
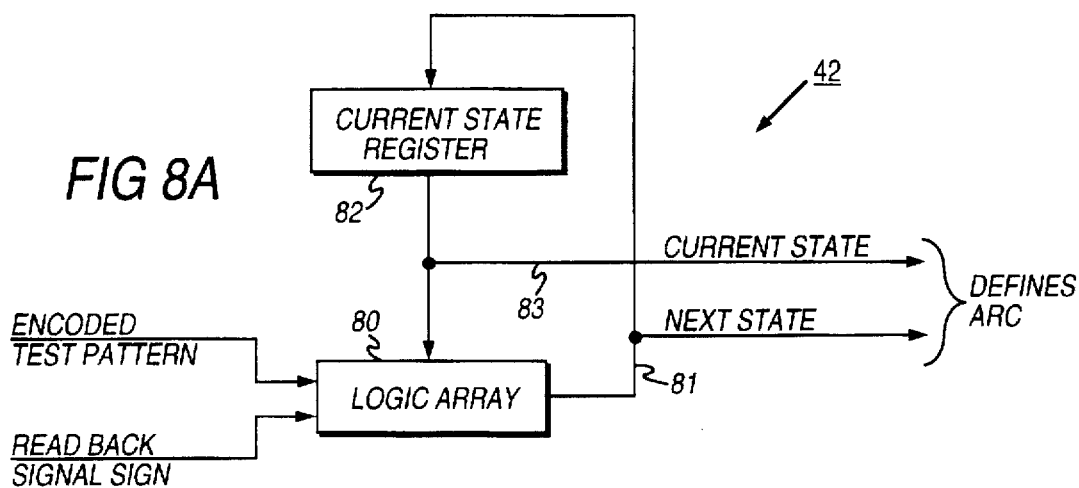
FIG. 8A shows further detail of the circuit of FIG. 5 and FIGS. 8B and 8C provide state diagrams and tables for explaining and illustrating the development of arc data.

FIG. 8A shows a circuit for implementing the channel data to arc conversion circuit 42. The encoded test pattern and the readback sign signal are received in logic array circuit 80. The logic array 80 identifies when a transition occurs and provides a "next state" signal on line 81. The next state signal on line 81 and the current state signal on line 83 define a distinct arc or path between the states and is the output of the circuit 42. The next state signal causes the displacement of the former state in the current state register 82 to set the circuit for the next bit period.

Figure 8B:
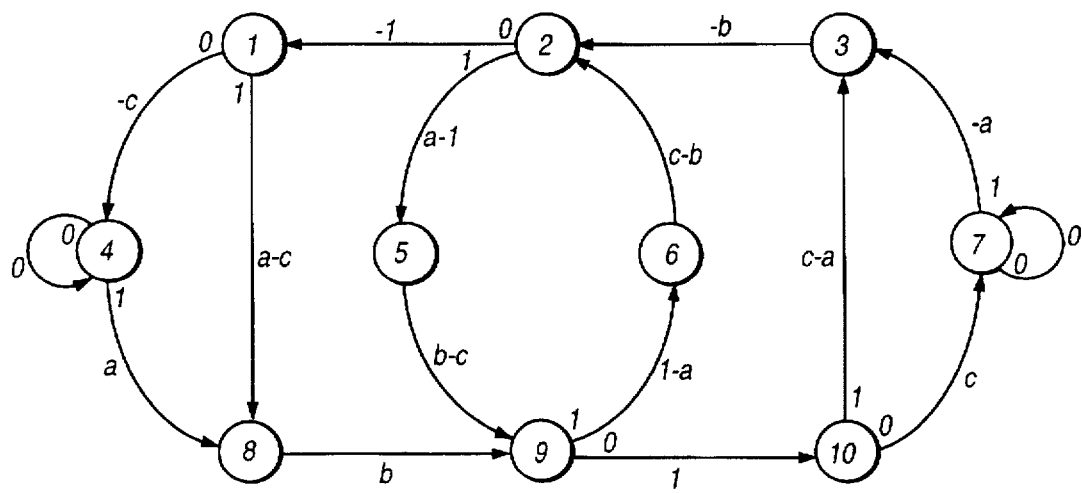
Figures 8C, 9A:
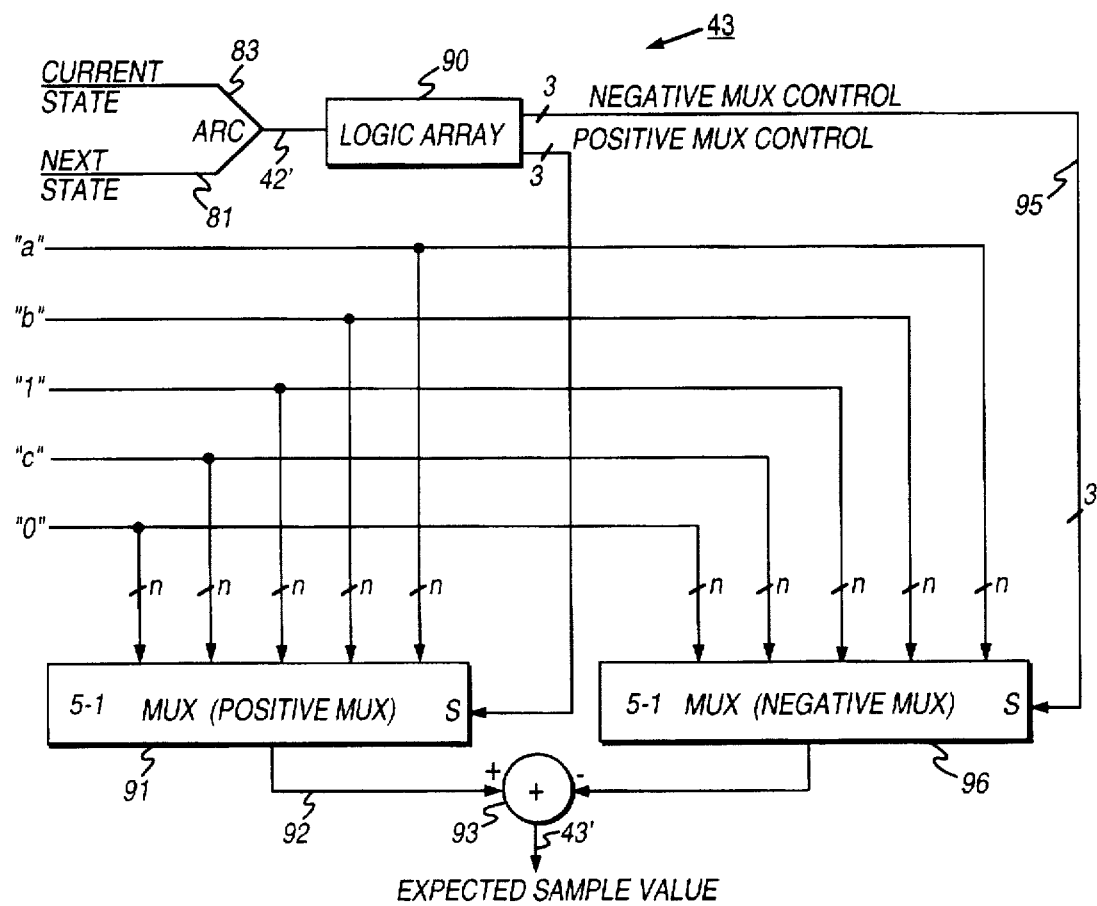
FIG. 9A shows further detail of the circuit of FIG. 5.

FIG. 8B shows the state diagram for the sequence detector described in U.S. Pat. No. 5,291,499, mentioned above and incorporated herein by reference. A state table for the sequence detector of FIG. 8B is shown in FIG. 8C and provides the logic found in logic array 80. For example, a positive isolated pulse is detected by a transition from state 4 to state 8 to state 9 to state 10 to state 7 and thereby encompasses the arcs in which successive sample values a, b, 1, and c are expected. A negative isolated pulse is detected by transitions from state 7 to 3 to 2 to 1 to 4. Various arcs are shown in FIG. 8B for those situations in which sample values corresponding to the utilized partial response signal model overlap one upon another, signifying the dense packing of pulses on the media. Such an arc is the transition from state 1 to state 8 in which the expected sample value is a–c.

Note in FIG. 8B that a transition from state 1 can occur to either state 4 or to state 8. The "zero" near state 1 shows that when the encoded test pattern is a zero, the arc transition is to state 4. The "one" near state 1 shows that when the encoded test pattern is a one, the arc transition is to state 8. Also note that if a zero is the next encoded bit in state 4, there is no transition from state 4. The table of FIG. 8C shows the situation in table form.

FIG. 9A shows a circuit for implementing the arc to expected sample conversion circuit 43. The arc data generated by circuit 42 are received in logic array circuit 90 over line 42'. If the bit stream input had indicated an isolated positive pulse, the arc data would cause logic array 90 to drive a sequential selection of "a", "b", 1 and "c" for an E2PR4 signal model from mux 91. With the assigned values "a"=0.5; "b"=1; and "c"=0.5, the sequential sample values output over line 92 are 0.5; 1; 1; 0.5. These values are added to zero in adder 93 since the isolated positive pulse ideally encounters no negative sample component.

Should the transitions be packed together in a partial response model bit stream, and the bit configuration be 1-0-1, the two received pulses for the one bits will overlap and thereby have sample values which subtract from each other. In this instance, the logic array 90 produces a positive mux control signal on line 94 for mux 91 and a negative mux control signal on line 95 for mux 96 to combine the appropriate positive and negative sample values in adder 93 to achieve the expected sample value for presentation to comparator 51 (FIG. 6).

FIG. 9B shows the state table for the sequence detector of FIG. 8C relative to the logic found in logic array 90. For example, if the current state input to the logic array 90 is "1" and the next state input is "8", the logic array 90 must produce a signal for the positive select: mux 91 which selects "a" and a signal for the negative select mux 93 to select "c". The expected sample output from adder 93 is then a–c which corresponds to the table shown in FIG. 9B and the arc shown in FIG. 8C.

Figure 10:
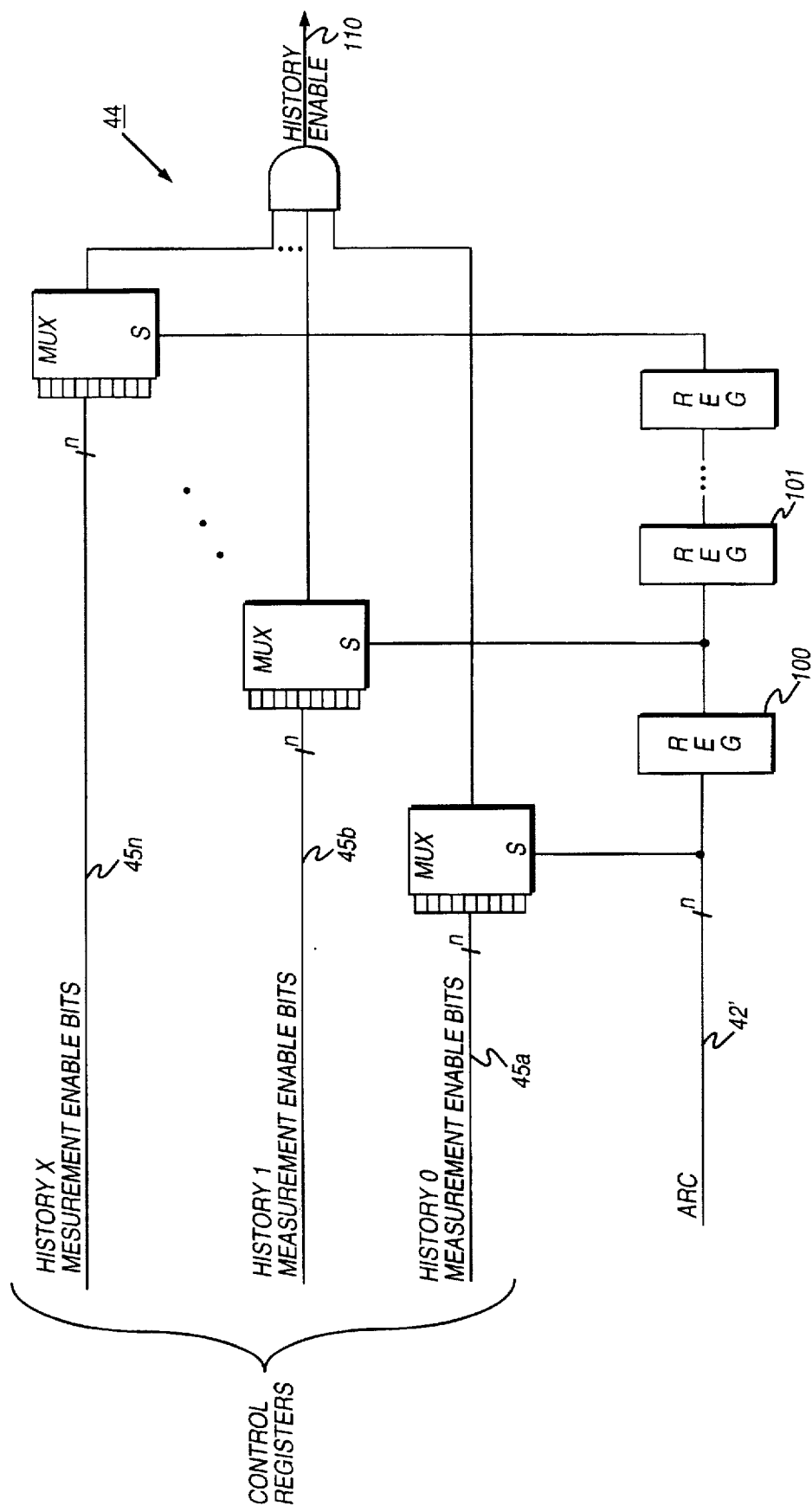
FIG. 10 shows further detail of the circuit of FIG. 5 with regard to relating samples to surrounding arcs for the accumulation of samples within a certain sequence.

FIG. 10 shows a circuit for implementing that portion of accumulator control circuit 44 that provides the user with the ability to program the selection of data measurement in accordance with its surroundings. The measurement enable bits are programmable by the user and loaded into the control registers on the integrated circuit chip. One measurement enable bit is designated for each arc for each stage of history.

The sequence of arcs is input on line 42' with the current arc located in register 100. The directly preceding arc is found in register 101, and preceding arcs to that in other registers of the group shown. Should the user desire to accumulate sample values for a particular arc whenever it occurs, the appropriate control register is programmed to provide the measurement enable bits on line 45a so that the accumulator enable signal is raised whenever that arc appears on line 42'. Should the accumulation be desired only when the arc occurs within a particular arc sequence, the measurement enable bits on lines 45a–45n are programmed so that the accumulator enable signal is raised only when that arc sequence is present. When the selected arc sequence is present, history enable signal 110 is raised and utilized to gate measurement data as shown in FIG. 7.

What has been described is a measurement circuit for generating data related to a digitized data stream in an integrated circuit read channel. Readback sample values from a test pattern are collected at the input to a sequence detector. Expected sample values from the test pattern are generated from a state machine model of the sequence detector. The readback samples are compared to the expected samples and errors accumulated during designated windows of operation. Sample errors may be squared if desired and may be compared to a threshold value before accumulation. The circuit of the invention also collects bit data from the output of the sequence detector for comparison to the generated bit data in order to determine bit error rate. Errors from the gain detector and from the phase detector are also collected. The error data can be programmed for collection according to its surroundings in a particular sequence of expected data. The collected and accumulated data are made available to the data output pins on the integrated circuit for analysis by the microprocessor. In that manner, changes in performance can be monitored and the effect of changes in the various control registers of the device can be observed.

While the invention has been described with reference to a specific embodiment, it should be understood that changes in form and detail can be made within the spirit and scope of the invention. For example, eight specific measured quantities are produced in the described embodiment but other quantities, for example, an accumulation of sample error values could be measured if desired. Also, the implementation shown is for processing of one sample value at a time but two or more sample values could also be processed if desired without departing from the spirit and scope of the invention which is defined in the following claims.

What is claimed is:

1. A channel quality circuit integrated into a synchronous read channel for reading data from a magnetic medium, the read channel detects digital data from a sequence of discrete time sample values generated by sampling an analog signal from a magnetic read head positioned over the magnetic medium, the channel quality circuit for monitoring the performance of a plurality of components of the sampled amplitude read channel, said channel quality circuit comprising:
  (a) a plurality of measurement inputs for receiving a plurality of measurement signals generated by at least one of the read channel components;
  (b) a comparator for comparing a first operand value, responsive to the measurement signals, to a predetermined threshold to generate an error value;
  (c) an error accumulator for accumulating a plurality of the error values;
  (d) a count accumulator for accumulating a number of error values stored in the error accumulator; and
  (e) an error output signal from the error accumulator and a count output signal from the count accumulator.

2. The channel quality circuit as recited in claim 1, further comprising programmable gating logic connected to the error and count accumulators for controlling accumulation of the error values with respect to the sequence of discrete time sample values read by the read channel.

3. The channel quality circuit as recited in claim 2, wherein:
  (a) the programmable gating logic comprises accumulation window logic having an input for receiving an asynchronous read gate signal indicative of when the read channel is reading the sample values; and
  (b) the error and count accumulators accumulate in response to the read gate signal.

4. The channel quality circuit as recited in claim 2, wherein:
  (a) the programmable gating logic comprises accumulation window logic having an input for receiving a synchronous sync mark detected signal indicative of when the read channel is synchronized in reading the data from the magnetic medium; and
  (b) the error and count accumulators accumulate in response to the sync mark detected signal.

5. The channel quality circuit as recited in claim 1, wherein the measurement signals comprise a phase error from a timing recovery component of the read channel.

6. The channel quality circuit as recited in claim 1, wherein the measurement signals comprise a gain error from a gain control component of the read channel.

7. A measurement circuit for monitoring the performance of a synchronous read channel for use with a magnetic storage device, said channel including a sequence detector responsive to discrete time readback sample values for detecting a sequence of estimated digital values, said measurement circuit comprising:
  (a) an input connected to receive said sequence of discrete time readback sample values;
  (b) an expected sample value generator for generating a sequence of expected sample values;

(c) a sample value comparator for comparing each of said expected sample values with a corresponding readback sample value and for producing a sample error value; and (d) a programmable threshold comparator for comparing said sample error value to a sample error threshold level.

8. The measurement circuit of claim 7, wherein the expected sample value generator is connected to receive the test pattern for use in generating the expected sample values.

9. The measurement circuit of claim 7, wherein said sample error threshold level comprises a programmable positive threshold level and a programmable negative threshold level.

10. A measurement circuit for monitoring the performance of a synchronous read channel for use with a magnetic storage device, said channel including a sequence detector responsive to discrete time readback sample values for detecting a sequence of estimated digital values, said measurement circuit comprising:

(a) an input connected to receive said sequence of discrete time readback sample values;

(b) an expected sample value generator for generating a sequence of expected sample values;

(c) a sample value comparator for comparing each of said expected sample values with a corresponding readback sample value and for producing a sample error value; and (d) a squaring circuit for squaring said sample error value to produce a squared sample error value.

11. A measurement circuit for monitoring the performance of a synchronous read channel for use with a magnetic storage device, said channel including a sequence detector responsive to discrete time readback sample values for detecting a sequence of estimated digital values, said measurement circuit comprising:

(a) an input connected to receive said sequence of discrete time readback sample values;

(b) an expected sample value generator for generating a sequence of expected sample values;

(c) a sample value comparator for comparing each of said expected sample values with a corresponding readback sample value and for producing a sample error value; and (d) a squaring circuit for squaring a timing error for producing a squared timing error value.

12. A measurement circuit for monitoring the performance of a synchronous read channel for use with a magnetic storage device, said channel including a sequence detector responsive to discrete time readback sample values for detecting a sequence of estimated digital values, said measurement circuit comprising:

(a) an input connected to receive said sequence of discrete time readback sample values;

(b) an expected sample value generator for generating a sequence of expected sample values;

(c) a sample value comparator for comparing each of said expected sample values with a corresponding readback sample value and for producing a sample error value; and (d) a squaring circuit for squaring a gain error for producing a squared gain error value.

13. A measurement circuit for monitoring the performance of a synchronous read channel for use with a magnetic storage device, said measurement circuit utilizing a test pattern of digital data written to and stored by said device and a sequence of discrete time readback sample values produced by reading said test pattern of digital data from said device, said measurement circuit incorporated with said channel into an integrated circuit, said channel including a sequence detector responsive to discrete time readback sample values for detecting a sequence of estimated digital values corresponding to digital data written to said storage device, said measurement circuit comprising:

(a) an input connected to receive said sequence of discrete time readback sample values;

(b) an expected sample value generator for generating a sequence of expected sample values;

(c) a sample value comparator for comparing each of said expected sample values with a corresponding readback sample value and for producing a sample error value; and (d) a bit comparator for comparing said test pattern of digital data with said sequence of estimated digital values for producing a bit error value.

14. A measurement circuit for monitoring the performance of a synchronous read channel for use with a magnetic storage device, said measurement circuit utilizing a test pattern of digital data written to and stored by said device and a sequence of discrete time readback sample values produced by reading said test pattern of digital data from said device, said measurement circuit incorporated with said channel into an integrated circuit, said channel including a sequence detector responsive to discrete time readback sample values for detecting a sequence of estimated digital values corresponding to digital data written to said storage device, said measurement circuit comprising:

(a) an input connected to receive said sequence of discrete time readback sample values;

(b) an expected sample value generator for generating a sequence of expected sample values;

(c) a sample value comparator for comparing each of said expected sample values with a corresponding readback sample value and for producing a sample error value;

(d) a test pattern to arc conversion circuit, responsive to said test pattern of digital data, for converting said test pattern of digital data to a sequence of arc transitions representing said sequence of expected sample values in accordance with a state machine model of said sequence detector, said state machine model comprising:

(a) a plurality of nodes wherein each node represents a bit location in said test pattern of digital data; and (b) at least two arc transitions between each node wherein each arc transition represents an expected sample value corresponding to a next bit value in said test pattern of digital data.

15. The measurement circuit of claim 14, wherein said expected sample values conform to an Extended, Extended Partial Response Class IV signal model, said expected sample values proportional to 1, 3, 3, 1.

16. The measurement circuit of claim 14, wherein said expected sample values conform to a modified Extended, Extended Partial Response Class IV signal model, said expected sample values proportional to 5/16, 1, 1, 5/16.

17. The measurement circuit of claim 14, wherein said expected sample values are programmable.

18. The measurement circuit of claim 14, wherein said expected sample values comprise four non-zero programmable values.

19. The measurement circuit of claim 14, further including a selection circuit for selecting one of said readback sample values for measurement when it occurs in a predetermined sequence of arc transitions.

20. The measurement circuit of claim 14, wherein said expected sample value generator further includes an arc to sample value conversion circuit responsive to said sequence of arc transitions for converting said arc transitions to said sequence of expected sample values.

21. The measurement circuit of claim 14, wherein the test pattern to arc conversion circuit is further responsive to a sign of said sequence of discrete time readback sample values.

22. A measurement circuit for monitoring the performance of a synchronous read channel for use with a magnetic storage device, said measurement circuit utilizing a test pattern of digital data written to and stored by said device and a sequence of discrete time readback sample values produced by reading said test pattern of digital data from said device, said measurement circuit incorporated with said channel into an integrated circuit, said channel including a sequence detector responsive to discrete time readback sample values for detecting a sequence of estimated digital values corresponding to digital data written to said storage device, said measurement circuit comprising:

(a) an input connected to receive said sequence of discrete time readback sample values;

(b) an expected sample value generator for generating a sequence of expected sample values;

(c) a sample value comparator for comparing each of said expected sample values with a corresponding readback sample value and for producing a sample error value; and (d) a signal generator for generating said test pattern of digital data.

23. The measurement circuit of claim 22, wherein the expected sample value generator is connected to receive the test pattern from the signal generator for use in generating the expected sample values.

24. The measurement circuit of claim 23, further comprising an accumulator for accumulating an error signal.

25. The measurement circuit of claim 22, wherein the signal generator is a linear feedback shift register.

26. A measurement circuit for monitoring the performance of a synchronous read channel for use with a magnetic storage device, said measurement circuit incorporated with said channel into an integrated circuit, said channel including a sequence detector responsive to discrete time readback sample values for detecting a sequence of estimated digital values, said measurement circuit comprising:

(a) an input connected to receive said sequence of discrete time readback sample values;

(b) an expected sample value generator for generating a sequence of expected sample values;

(c) a sample value comparator for comparing each of said expected sample values with a corresponding readback sample value and for producing a sample error value;

(d) an accumulator for accumulating said sample error values; and (e) gating logic, responsive to an input signal for controlling said accumulator.

27. The measurement circuit of claim 26, further including a counter for counting a number of sample error values accumulated.

28. The measurement circuit of claim 26, wherein the expected sample value generator is connected to receive the test pattern for use in generating the expected sample values.

29. The measurement circuit of claim 26, wherein said input signal is an accumulation enable signal generated by a micro-controller.

30. The measurement circuit of claim 26, wherein said input signal is a sync mark found signal generated by a sync detector integrated into said read channel.

31. The measurement circuit of claim 26, wherein said input signal is an async mode signal generated by a micro-controller wherein said gating logic causes said sample error values to be accumulated in an asynchronous mode when the async mode signal is active and in a synchronous mode when the async mode signal is inactive.

* * * * *

UNITED STATES PATENT AND TRADEMARK OFFICE
CERTIFICATE OF CORRECTION

PATENT NO. : 5,761,212
DATED : June 2, 1998
INVENTOR(S) : William R. Foland et al.

It is certified that error appears in the above-identified patent and that said Letters Patent is hereby corrected as shown below:

Col. 13, line 9
 replace "the"
 with --a--.

Col. 16, line 25
 replace "the"
 with --a--.

Signed and Sealed this

Eighth Day of December, 1998

Attest:

BRUCE LEHMAN

*Attesting Officer*    *Commissioner of Patents and Trademarks*